United States Patent [19]

Van Der Borst et al.

[11] Patent Number: 4,870,281

[45] Date of Patent: Sep. 26, 1989

[54] GAS-FILLED X-RAY DETECTOR

[75] Inventors: Johannes Van Der Borst; Lourens Valkonet; Frans G. Vreugdenhil, all of Eindhoven, Netherlands

[73] Assignee: U.S. Philips Corporation, New York, N.Y.

[21] Appl. No.: 152,179

[22] Filed: Feb. 4, 1988

[30] Foreign Application Priority Data

Feb. 13, 1987 [NL] Netherlands ........................ 8700346

[51] Int. Cl.[4] ................................................ G01T 1/18

[52] U.S. Cl. .................................... 250/374; 250/379; 313/93

[58] Field of Search ...................... 250/374, 379, 385.1; 313/93

[56] References Cited

U.S. PATENT DOCUMENTS 2,837,677 6/1958 Hendee et al. ...................... 250/374

*Primary Examiner*—Carolyn E. Fields

*Attorney, Agent, or Firm*—Paul R. Miller

[57] ABSTRACT

The anode connections in a gas-filled X-ray detector are mounted so as to extend transversely of the anode wire so that a substantial saving as regards space is achieved. In order to reduce field inhomogeneities in the ionization space, there may be provided a field profile bush which partly encloses the anode wire and field bushes may be arranged around the anode connection pins.

15 Claims, 1 Drawing Sheet

GAS-FILLED X-RAY DETECTOR

The invention relates to an X-ray detector, comprising a gas-filled envelope provided with an exit window and anode connection pins and in which there is arranged a wire-shaped anode, and also relates to an X-ray analysis apparatus comprising such a detector.

In known gas-filled detectors the anode connection pin are situated in the prolongation of the anode wire. In order to prevent field disturbances, the window is substantially smaller, measured in the direction of the anode wire, than the length of the anode wire measured between the anode connection pins. The detector has a circular-cylindrical construction, the anode wire being coincident with the cylinder axis.

A detector construction of this kind offers many advantages, for example the symmetry in the ionization space and the absence of further structural parts or connection electrodes in that space.

When known gas-filled detectors are used, for example in an X-ray analysis apparatus, however, a drawback exists in that the detectors occupy a comparatively large amount of space in a direction transversely of the propagation direction of the radiation to be measured, the available space being limited in this direction. Moreover, the external anode connection pins often are not readily accessible and the exchange of a detector represents a cumbersome operation.

It is the object of the invention to mitigate these drawbacks; to achieve this, an X-ray detector of the kind set forth in accordance with the invention is characterized in that the anode connection pins are situated in a wall portion opposite the entrance window and are directed transversely of the longitudinal direction of the anode wire.

The construction of the detetor in accordance with the invention enables a substantial reduction of notably the dimension of the detector, measured in the longitudinal direction of the anode wire, i.e. transversely of the direction of the radiation to be measured, and also ensures that the connections for the anode wire are always readily accessible when the detector is mounted in an X-ray analysis apparatus.

The envelope of the detector in a preferred embodiment is substantially cylindrical, the entrance window being situated in a first axial end face while the connection pins are situated in an oppositely situated second axial end face. A rugged and compact detector construction is thus obtained.

In a further preferred embodiment, a field profile bush which partly encloses the anode wire is accommodated within the envelope in order to homogenize an electric field to be applied in the ionization space surrounding the anode wire. In order to prevent adverse field effects of the anode connection pins, insulated field bushes are provided. The field profile bush can be arranged on these field bushes and is also in suitable electrical contact with the envelope.

In a preferred embodiment in the form of a sealed gas detector, the anode wire is connected to the anode pins by way of burr-free spot welding. In a detector of this kind a beryllium entrance window can be connected to the window plate in a vacuum-tight manner by way of a multiple bonding layer provided thereon.

In a preferred embodiment of a gas-filled detector in the form of a flowcounter, the anode connection pins are constructed so as to be hollow and the anode wire is detachably connected thereto by means of, for example suitable round head rivets. An exit window which consists of, for example plastics and which is possibly reinforced with a gauze can then be detachably connected to the entrance window plate by means of an O-ring seal.

Some preferred embodiments in accordance with the invention will be described in detail hereinafter with reference to the drawing. Therein:

Figure 1:
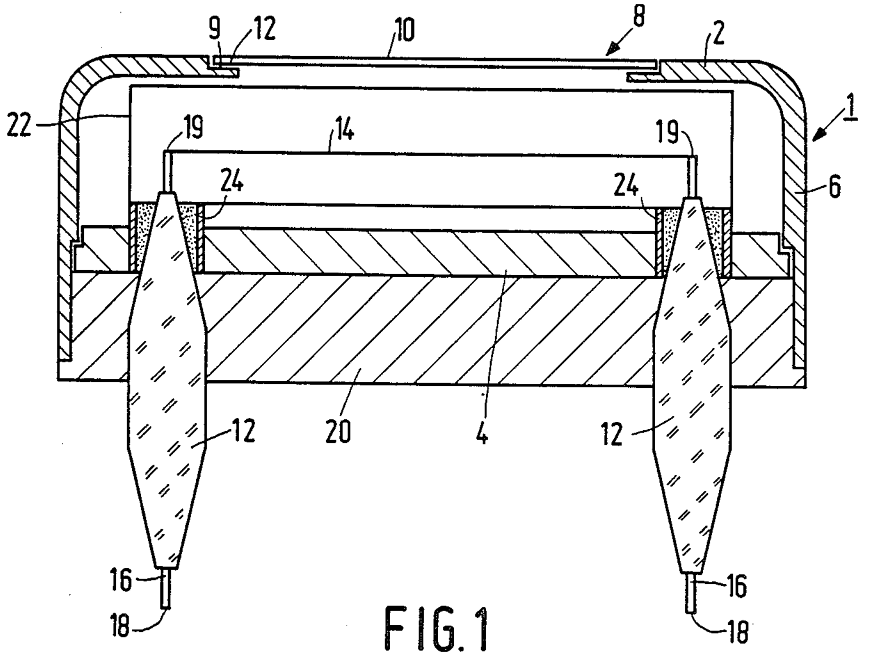
FIG. 1 shows a sealed X-ray detector in accordance with the invention.

A detector as shown in FIG. 1 comprises an envelope 1 with a window carrier plate 2, a rear plate 4 and a cylindrical side wall 6. The window carrier plate and the side wall can be constructed together as a window cap. In the window carrier plate there is provided a window aperture 8 with, for example a supporting rim 9 on which an entrance window 10 can be mounted. The entrance window is customarily made of beryllium. For connecting the window to the window carrier plate the beryllium disk is covered by a bonding layer 12 over an annular portion to be bonded. Preferably, first an anti-diffusion layer is provided, on which subsequently a layer is provided which can be readily bonded to the carrier rim. For a more detailed description of feasible window bonding techniques, reference is made to U.S. Pat. No. 4,431,703. The effective window surface area amounts to, for example 10×12 mm for an anode wire having a length of 15 mm between the anode connection pins. The thickness of the window is dependent of the gas filling which itself is adapted to the wavelength of the radiation to be measured, for example 0.3 mm for a counter filled with xenon, 0.1 mm for a counter filled with krypton, and 0.05 mm for a counter filled with neon. In the rear wall 4 of the envelope there are provided two anode connection pins 12 for an anode wire 14 to be mounted inside the housing. Each of the connection pins comprises a conductor 16 which is accessible on an outer side 18 and whereto the anode wire can be secured on an inner side 19. By the external connections a detection circuit (not shown) can be connected. For correct mounting and for increased ruggedness of the envelope a mounting plate 20 is provided on the rear wall. This mounting plate also serves as an additional carrier for the feed-through pins. The anode wire is connected to the feed-through pins, for example by soldering or preferably by burr-less welding.

In the housing there is arranged a field profile bush 22 whereby a suitably uniform ionization space can be realized around the anode wire. The field profile bush is shaped, for example as a U-profile having a length of, for example 22 mm, a width of 15 mm and a depth of 13.5 mm. The anode wire coincides substantially with a center-line of this U-profile. Around the anode connection pins there are mounted field bushes 24 in order to avoide electrical discharging phenomena. Preferably, the field profile bush is electrically connected to the field bushes as well as to the bottom plate 4 and forms a cylindrical ionization space around the anode wire within the substantially cylindrical space in the envelope.

Figure 2:
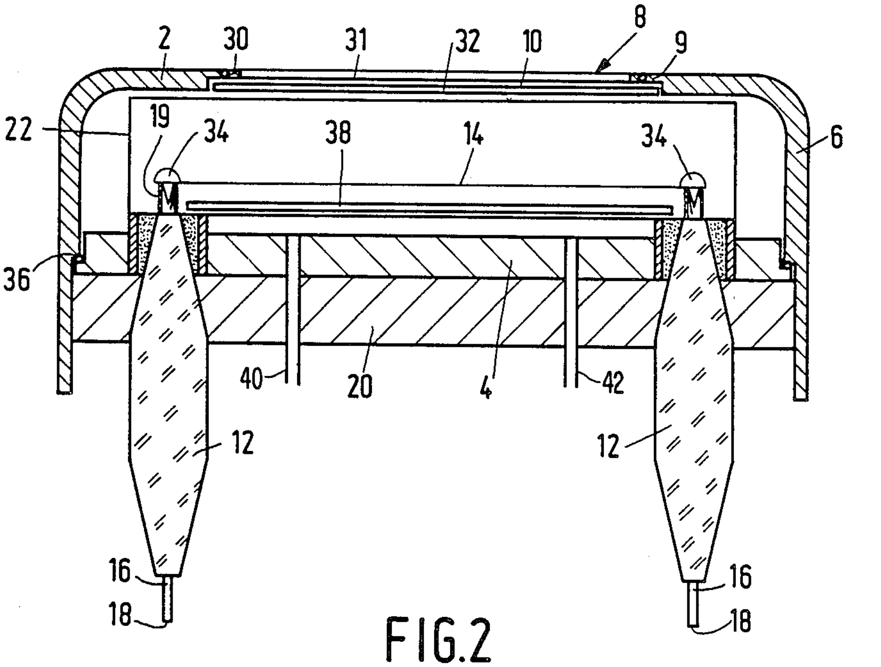
FIG. 2 shows an X-ray detector in accordance with the invention which is constructed as a flowcounter.

FIG. 2 shows a gas detector constructed as a flowcounter which is specifically intended for the measurement of comparatively soft radiation, so for the analysis of light elements. The housing 1 again comprises a window carrier plate 2, a wall section 6 and a bottom plate 4. A window aperture 8 comprises a carrier rim 9 which in this case comprises a sealing O-ring 30 and the window plate which is in this case composed of, for example a plastics film 31 and a carrier grid 32. In the bottom plate 4 there are again provided anode feed-through pins 12 with electrical conductors 16, external connections 18 and internal connections 19, it again being possible to provide field bushes around the connection pins. In the present embodiment the inner connections 19 of the anode connection pins are constructed so as to be hollow. The anode wire 14 is detachably secured in the cavities of the connections by means of round head rivets 34. In order to form a detachable seal in conjunction with the window cap, an O-ring seal 36 is provided between the cylindrical wall portion 6 and the bottom plate 4. In the field profile bush 22 there is arranged a beryllium plate 38 in order to reduce the occurrence of secondary radiation in the ionization space. For gas circulation through the counter an inlet duct 40 and an outlet duct 42 are provided in the bottom plate, which ducts open underneath the field profile bush, viewed from the anode wire, in order to reduce field disturbances. The cylindrical wall portion 6 may form a circular cylinder within which the field profile bush again separates a cylindrical ionization space. The side wall may also have a different shape, for example it may be adapted directly to an elongated shape of the exit window, the anode wire and the field profile bush.

What is claimed is:

1. An X-ray detector comprising
(a) a gas filled envelope having an entrance window,
(b) anode connection pins extending into said envelope, said anode connection pins being disposed through a wall portion opposite to said entrance window, and
(c) a wire-shaped anode disposed in said envelope, said anode connection pins being directed transversely of the longitudinal direction of said anode.

2. An X-ray detector according to claim 1, wherein said envelope is cylindrical in shape, and wherein said entrance window is disposed in a first axial end face, and said anode connection pins are disposed in an oppositely disposed second axial end face.

3. An X-ray detector according to claim 1 or claim 2, wherein said wire-shaped anode is disposed on said anode connection pins by a burr-free weld connection.

4. An X-ray detector according to claim 3, wherein said entrance window is beryllium, and wherein the beryllium window is provided vacuum-tight to a window carrier plate of said envelope by an intermediate layer of a composite bond.

5. An X-ray detector according to claim 4, wherein a field profile bush partially encloses said anode inside said envelope.

6. An X-ray detector according to claim 5, wherein field bushes are disposed around said anode connection pins inside said envelope.

7. An X-ray detector according to claim 1 or claim 2, wherein a field profile bush partially encloses said anode inside said envelope.

8. An X-ray detector according to claim 7, wherein field bushes are disposed around said anode connection pins inside said envelope.

9. An X-ray detector according to claim 8, wherein ends of said anode connection pins inside said envelope are hollow, said anode having ends detachably clamped in the hollow ends.

10. An X-ray detector according to claim 9, wherein said envelope has detachable seals, and said envelope is a flow-counter.

11. An X-ray detector according to claim 10, wherein said entrance window includes a plastic foil and a carrier grid, said entrance window being connected to a window carrier of said envelope by an O-ring seal.

12. An X-ray detector according to claim 1 or claim 2, wherein said entrance window is beryllium, and wherein the beryllium window is provided vacuum-tight to a window carrier plate of said envelope by an intermediate layer of a composite bond.

13. An X-ray detector according to claim 1 or claim 2, wherein said envelope has detachable seals, and said envelope is a flow-counter.

14. An X-ray detector according to claim 13, wherein said entrance window includes a plastic foil and a carrier grid, said entrance window being connected to a window carrier of said envelope by an O-ring seal.

15. In an improved X-ray analysis apparatus, the improvement comprising an X-ray detector comprising
(a) a gas filled envelope having an entrance window,
(b) anode connection pins extending into said envelope, said anode connection pins being disposed through a wall portion opposite to said entrance window, and
(c) a wire-shaped anode disposed in said envelope, said anode connection pins being directed transversely of the longitudinal direction of said anode.

* * * * *